United States Patent
Marteinsson et al.

(10) Patent No.: US 10,988,551 B2
(45) Date of Patent: Apr. 27, 2021

(54) PROCESSES FOR MAKING CHITOSAN SALTS AND PRODUCTS FORMED THEREBY

(71) Applicant: Primex EHF., Siglufjordur (IS)

(72) Inventors: Runar Marteinsson, Siglufjordur (IS); Hélène L. Lauzon, Siglufjordur (IS)

(73) Assignee: PRIMEX EHF., Siglufjordur (IS)

( * ) Notice: Subject to any disclaimer, the term of this patent is extended or adjusted under 35 U.S.C. 154(b) by 0 days.

(21) Appl. No.: 16/506,230

(22) Filed: Jul. 9, 2019

(65) Prior Publication Data

US 2020/0017608 A1    Jan. 16, 2020

Related U.S. Application Data

(60) Provisional application No. 62/695,865, filed on Jul. 10, 2018.

(51) Int. Cl.
  *C08B 37/08* (2006.01)
  *C08L 5/08* (2006.01)

(52) U.S. Cl.
  CPC .............. *C08B 37/003* (2013.01); *C08L 5/08* (2013.01)

(58) Field of Classification Search
  CPC .................................. C08B 37/003; C08L 5/08
  See application file for complete search history.

(56) References Cited

U.S. PATENT DOCUMENTS 6,130,321 A    10/2000   Johnson et al.

FOREIGN PATENT DOCUMENTS

FR    2874926    3/2006

OTHER PUBLICATIONS

Kasaai et al., Journal of Polymer Science: Part B: Polymer Physics, 2000, 38, p. 2591-2598. (Year: 2000).*
Zhang et al., International Journal of Food Properties, 2013, 17:1, p. 26-37. (Year: 2013).*
Mayachiew et al., Drying Technology, 2008, 26, p. 176-185. (Year: 2008).*
Ogawa, K., Agric. Biol. Chem., 1991, 55 (9), p. 2375-2379. (Year: 1991).*
PCT/IB2019/055833, "International Search Report and Written Opinion", dated Oct. 2, 2019, 11 pages.
John Barley, "Basic Principles of Freeze Drying", SP Scientific, Warminster, PA.; (No Date Available). Retrieved Nov. 19, 2020: https://www.spscientific.com/freeze-drying-lyophilization-basics; 10 pages.
Sasha Rousseau, "What Is a Hydrated Salt?", sciencing.com.; (Apr. 26, 2018). Retrieved Nov. 19, 2020: https://sciencing.com/hydrated-salt-8700669.html; 2 pages.
American Heritage® Dictionary Definition of "hydrate". American Heritage® Dictionary of the English Language, Fifth Ed., Houghton Mifflin Harcourt Co.; (2016). Retrieved Nov. 19, 2020: https://www.thefreedictionary.com/Hydrate+salt; 1 page.

* cited by examiner

*Primary Examiner* — Jonathan S Lau
(74) *Attorney, Agent, or Firm* — Kilpatrick, Townsend & Stockton LLP

(57) ABSTRACT

The present disclosure generally relates to improved processes for making chitosan salts and products formed by such processes. In certain embodiments, the processes disclosed herein provide the ability to make high-grade chitosan salts at lower cost and with improved environmental friendliness.

20 Claims, 2 Drawing Sheets

PROCESSES FOR MAKING CHITOSAN SALTS AND PRODUCTS FORMED THEREBY

CROSS-REFERENCES TO RELATED APPLICATIONS

This application claims the benefit of and the priority to U.S. Provisional Patent Application No. 62/695,865, which was filed Jul. 10, 2018, titled "PROCESS FOR MAKING CHITOSAN SALTS AND PRODUCTS FORMED THEREBY". The content of the aforementioned disclosure is hereby incorporated in its entirety by reference.

TECHNICAL FIELD

The present disclosure generally relates to improved processes for making chitosan salts and products formed by such processes. In certain embodiments, the processes disclosed herein provide the ability to make high-grade chitosan salts at lower cost and with improved environmental friendliness.

DESCRIPTION OF RELATED ART

Chitosan is a linear polysaccharide consisting of randomly distributed β-(1→4)-linked N-acetyl-D-glucosamine and D-glucosamine units obtained from the deacetylation of chitin, a natural fiber found in some invertebrates, such as in the exoskeletons of crustaceans, the cuticles of some insects, and the cell wall of certain fungi. Chitin with a degree of deacetylation (DDA), such as 50% or greater, is considered to be chitosan. Chitin is insoluble in most organic solvents while chitosan is soluble in dilute acidic solutions having a pH below 6.0. This is due to the presence of the amino group in the chitin becoming reactive upon deacetylation. Two parameters that influence the properties of chitosan are its molecular weight (MW) and its DDA. Due to the diversity of the sources of chitosan, and to the fact that it is commercially available with a wide range of DDA and MW, each of which may affect chitosan's properties, it is recognized that the source and processing procedures used in the manufacturing of chitosan will affect its bioactivity.

Some fibers are known to reduce the intestinal absorption of fat and cholesterol in the diet, mainly following the entrapment caused by a viscous polysaccharide solution or the increased viscosity of the polysaccharide once in stomach acid. Chitosan, being the only amino-polysaccharide naturally occurring on earth, has a structural advantage compared to other fibers because it becomes cationic under acidic conditions (e.g., pH of 6 or lower). This renders possible the attraction of anionic substances, such as fatty acids and bile acids, to chitosan, which results in a spontaneous formation of an insoluble chitosan salt. In addition, the hydrophobic nature of chitosan allows cholesterol and other neutral lipids to bind via hydrophobic interactions. Chitosan dissolves under gastric condition and emulsifies oil, before forming a flocculus at the higher duodenal pH (6.5-7.5). The flocculus formed entraps dietary oil and prevents lipid absorption through the intestinal wall, leading to the oil being excreted with the feces and a lower caloric intake. Therefore, chitosan is considered as being lipid-lowering and hypocholesterolemic, as it can reduce fat absorption and enterohepatic bile acid circulation. The fat-binding properties of chitosan products vary depending, in large part, on their ability to solubilize rapidly under stomach acid conditions. The effectiveness of this binding varies depending on the source of the chitin and the processes for converting it to chitosan. Therefore, it is desirable to develop processing methods that result in chitosan having effective fat-binding. Processes for making chitosan having such beneficial properties are known but can involve the use of large amounts of water and a number of processing steps. Thus, there is a continuing need for processes for making chitosan that require less water, fewer processing steps, provide high quality chitosan salts and maintain the beneficial fat-binding properties of the resulting chitosan.

SUMMARY

The processes disclosed herein provide a means of making chitosan that overcomes one or more of the problems mentioned above. In particular, the processes disclosed herein require much less water than other processing methods as well as the use of unmilled chitosan, reducing the number of processing steps, for the salification process.

In a first aspect, the disclosure provides methods for making a chitosan salt, which include: providing a chitosan composition, which comprises chitosan; combining the chitosan composition with water and one or more acids to form a hydrated chitosan composition; and removing at least a portion of the water from the hydrated chitosan composition to form a dried chitosan salt composition, which comprises chitosan salt. In some embodiments, the hydrated chitosan composition includes from 50% to 150%, or from 50% to 120%, or from 50% to 100%, of water relative to chitosan, based on a relative weight of water to chitosan in the hydrated chitosan composition.

In a second aspect, the disclosure provides dried chitosan salt compositions formed by the processes of the first aspect or any embodiments thereof.

Further aspects and embodiments disclosed herein are set forth in the Detailed Description below.

BRIEF DESCRIPTION OF THE DRAWINGS

The following drawings are provided for purposes of illustrating various embodiments of the compositions and methods disclosed herein. The drawings are provided for illustrative purposes only and are not intended to describe any preferred compositions or preferred methods, or to serve as a source of any limitations on the scope of the claimed inventions.

DETAILED DESCRIPTION

Figure 1:
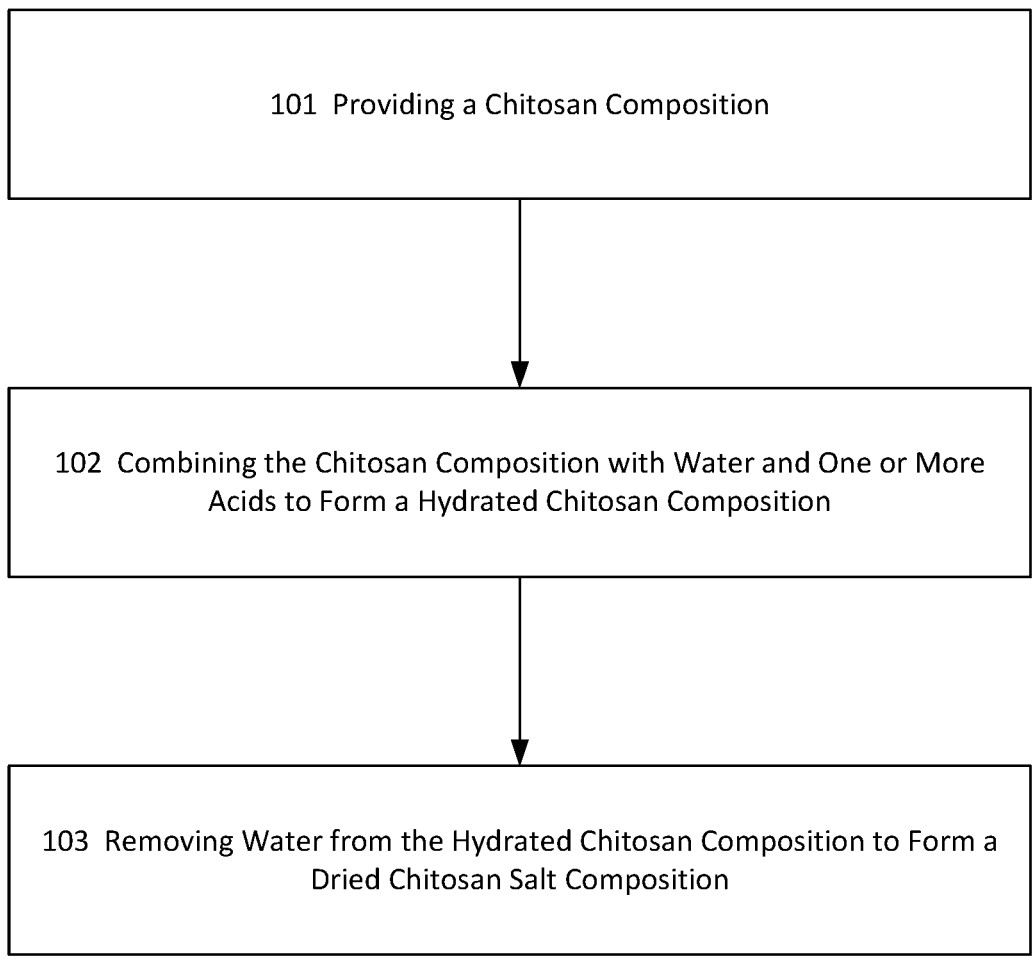
FIG. 1 shows an embodiment of the processes disclosed herein.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the term "chitosan" refers to a linear polysaccharide that includes constitutional units formed from D-glucosamine and N-acetyl-D-glucosamine, which are linked together in a beta configuration through the 1 and 4 positions. The D-glucosamine and N-acetyl-D-glucosamine units need not be ordered in any particular way, such as in an alternating configuration. The numerical proportion of D-glucosamine units of the total number of D-glucosamine and N-acetyl-D-glucosamine units can be referred to as the "degree of deacetylation" (DDA) and is generally reported as a percentage. In general, the term "chitosan" refers to such polysaccharides having at least a 50% DDA. Chitosan generally has a weight-average molecular weight ranging from 3000 Da up to 1,000,000 Da.

Other terms are defined in other portions of this description, even though not included in this subsection.

Processes for Making Chitosan Salts

In at least one aspect, the disclosure provides methods for making a chitosan salt, which include: providing a chitosan composition, which comprises chitosan; combining the chitosan composition with water and one or more acids to form a hydrated chitosan composition; and removing at least a portion of the water from the hydrated chitosan composition to form a dried chitosan salt composition, which comprises chitosan salt.

The methods disclosed herein include providing a chitosan composition, which comprises chitosan. The chitosan composition can be provided in any suitable form. In general, such chitosan compositions are in dry form and contain mostly chitosan. For example, in some embodiments, the chitosan composition comprises at least 75 weight percent, or at least 80 weight percent, or at least 85 weight percent, or at least 90 weight percent, or at least 95 weight percent, or at least 97 weight percent, or at least 99 weight percent, chitosan, based on the total weight of solids in the composition. In some embodiments, the chitosan composition also includes one or more additives, such as additives generally included in food-grade or pharmaceutical-grade powders.

Chitosan can have different crystalline properties, depending on a number of factors, such as the source of the chitosan. Chitosan obtained from crustacean sources generally has high crystallinity, and is referred to as alpha-chitosan. Highly crystalline forms of chitosan from other sources can also be referred to as alpha-chitosan. By contrast, chitosan obtained from jumbo squids has a relatively lower crystallinity and is referred to as beta-chitosan. Low-crystalline forms of chitosan from other sources can also be referred to as beta-chitosan. Any crystalline form of chitosan can be used in the methods disclosed herein. Even so, in some embodiments, the chitosan comprises at least 75 weight percent, or at least 80 weight percent, or at least 85 weight percent, or at least 90 weight percent, or at least 95 weight percent, or at least 97 weight percent, or at least 99 weight percent, alpha-chitosan, based on the total weight of chitosan in the composition.

As noted above, chitosan can be obtained from a variety of different sources. The methods disclosed herein are not limited to chitosan obtained from any particular source. Even so, in some embodiments, the chitosan comprises at least 75 weight percent, or at least 80 weight percent, or at least 85 weight percent, or at least 90 weight percent, or at least 95 weight percent, or at least 97 weight percent, or at least 99 weight percent, chitosan of crustacean origin, based on the total weight of chitosan in the composition. In some further embodiments, the chitosan comprises at least 75 weight percent, or at least 80 weight percent, or at least 85 weight percent, or at least 90 weight percent, or at least 95 weight percent, or at least 97 weight percent, or at least 99 weight percent, chitosan of shrimp origin, based on the total weight of chitosan in the composition. In some embodiments, the chitosan in the chitosan composition is entirely of crustacean origin, such as entirely obtained from shrimp (e.g., shrimp caught from the northern Atlantic Ocean, such as shrimp of the *Pandalus borealis* species).

Chitosan can be described using a number of different physical parameters. One such physical parameter is its apparent viscosity. As used herein, the term "apparent viscosity" refers to the Brookfield rotational viscosity at 25° C. of an aqueous composition of 1% chitosan by weight and 1% acetic acid by weight. The resulting measurement is reported in centipoise (cP). The methods disclosed herein can use chitosan having any suitable apparent viscosity. Even so, in some embodiments, the chitosan has an apparent viscosity ranging from 20 cP to 200,000 cP, or from 30 cP to 10,000 cP, or from 40 cP to 2,000 cP.

Chitosan can also be described by its weight-average molecular weight (or referred to in shorthand manner as merely "molecular weight"). The methods disclosed herein can use chitosan having any suitable apparent molecular weight. Even so, in some embodiments, chitosan having higher molecular weights may be more suitable. For example, in some embodiments, the chitosan has weight-average molecular weight ranging from 100 kDa to 2,000 kDa, or from 100 kDa to 1,000 kDa.

Also, as described above, chitosan can be described in terms of its degree of deacetylation (DDA), which is defined above. The methods disclosed herein can use chitosan having any DDA. Even so, in some embodiments, the chitosan has a degree of deacetylation (DDA) of at least 60%, or at least 65%, or at least 70%.

It was surprisingly discovered that using chitosan having a larger particle size led to certain improvements, such as resulting chitosan salt particles having a more homogeneous particle size and color. So, while the methods disclosed herein may be carried out using chitosan of any suitable particle size, larger particle sizes appear to lead to improved results. Thus, in some embodiments, the chitosan composition comprises chitosan in the form of a plurality of particles, wherein the plurality of particles has a particle size of at least 18 mesh (at least 1.0 mm). In some embodiments, the chitosan composition comprises chitosan in the form of a plurality of particles, wherein the plurality of particles has a particle size greater than 18 mesh (greater than 1.0 mm).

But it is generally desirable to avoid including too many particles that are too large. Thus, in some embodiments, no more than 5 weight percent, or no more than 3 weight percent, or no more than 1 weight percent of the plurality of particles have a particle size greater than 3 mm.

In general, it is desirable that the chitosan particles have a fairly homogeneous size spread. Thus, in some embodiments, at least 95 weight percent, or at least 97 weight percent, or at least 99 weight percent of the plurality of chitosan particles have a particle size in the range from 1 mm to 3 mm.

The methods disclosed herein include combining the chitosan composition with water. Any suitable form of water can be used. In some embodiments, the water is deionized water. In some other embodiments, the water is tap or drinking water. In this instance, it was discovered that using smaller amounts of water, for example, such that the resulting mixture may even form a slurry or paste or hydrated chitosan, yields desirable results. Such desirable results include the formation of chitosan salts having one or more of the following properties: rapid acid solubilization, water solubility, high fat binding, when ingested orally by a human or animal user, and a low production cost, due to an environmentally friendly, solvent-free process. Thus, in some embodiments, the water is added in an amount such that the hydrated chitosan composition comprises from 50% to 150%, or from 50% to 120%, or from 50% to 100%, of water relative to chitosan, based on a relative weight of water to chitosan in the hydrated chitosan composition. Note that the water may be combined in any suitable manner and does not imply any certain degree or form of mixing. In general, however, a thorough mixing is desired so as to produce a reasonably homogeneous mixture.

The methods disclosed herein also include combining the water with the chitosan in the presence of one or more acids. This terminology does not imply any particular order of mixing. In some embodiments, for example, the acid can be added to the water, and then the acidified water mixture combined with the chitosan. In other embodiments, however, the water may be combined with the chitosan initially, and then the acid is added subsequently. The one or more acids can be present in any suitable amount. For example, in some embodiments, the hydrated chitosan composition comprises from 1% to 25%, or from 3% to 20%, or from 1% to 15%, or from 10% to 15% of the one or more acids relative to chitosan, based on a relative weight of the one or more acids to chitosan in the hydrated chitosan composition.

By adding the acid and the water in the above proportions, one can achieve desirable properties, such as high quality chitosan with rapid acid solubilization and high fat-binding, or water solubility.

Any suitable acids may be used. In some embodiments, the one or more acids comprise an organic acid. In some such embodiments, the organic acid is an aliphatic or aromatic carboxylic acid having from 1 to 12 carbon atoms. In some further such embodiments, the organic acid is selected from the group consisting of succinic acid, adipic acid, glutamic acid, lactic acid, aspartic acid, acetic acid, ascorbic acid, pyruvic acid, malic acid, fumaric acid, citric acid, formic acid, glucuronic acid, sorbic acid, folic acid, maleic acid, and any combinations thereof. In some embodiments, the organic acid is succinic acid.

In some instances, inorganic acids can also be used. Thus, in some embodiments, the one or more organic acids include an inorganic acid, such as hydrochloric acid.

The methods disclosed herein do not require the addition of an organic solvent to achieve a desirable hydrated composition. Thus, in some embodiments, the hydrated chitosan composition is substantially free of organic solvents, e.g., includes no more than 3 weight percent, or no more than 2 weight percent, or no more than 1 weight percent, organic solvent, based on the total weight of the hydrated chitosan composition.

The combining can be carried out in any suitable vessel. The vessel needs not to be made of any particular material, and can be made of metal, such as stainless steel, glass, plastic, and the like. In some embodiments, the combining step comprises forming the hydrated chitosan composition in a reactor, such as a stainless-steel reactor.

The methods disclosed herein also include removing at least a portion of the water from the hydrated chitosan composition, for example, to permit the formation of a dried powder that can be processed. The water removal can be carried out by any suitable means, including evaporation, vacuum-assisted removal, and the like. In some embodiments, the water is removed by evaporation assisted by heat. Thus, in some embodiments, the removing step comprises heating the hydrated chitosan composition, for example to a temperature of no more than 70° C., or no more than 65° C., or no more than 60° C. In some such embodiments, the heating comprises using steam.

The water is removed to form a reasonably dry composition that includes the chitosan salt. In some embodiments, the resulting chitosan salt composition has a moisture content of no more than 20%, or no more than 15%, or no more than 10%, or no more than 5%, or no more than 3%, or no more than 1%, based on the weight of water in the composition relative to the weight of the composition.

In certain embodiments of the methods disclosed herein, the dried chitosan salt composition is broken up to reduce the size of the resulting particles. Thus, in some embodiments, the methods include forming a plurality of chitosan salt particles from the dried chitosan salt composition. This can be carried out by any suitable means, such as grinding, milling, and the like. In some instances, it can be desirable to mill the particles down to a relatively small size. Thus, in some embodiments, the plurality of chitosan salt particles is milled to a particle size of no less than 20 mesh (i.e., no more than 0.841 mm), or no less than 40 mesh (i.e., no more than 0.400 mm), or no less than 50 mesh (i.e., no more than 0.297 mm), or no less than 100 mesh (i.e., no more than 0.149 mm), or no less than 200 mesh (i.e., no more than 0.074 mm).

FIG. 1 shows a process flow 100 for certain embodiments of the methods disclosed herein. The illustrated method includes the steps of: providing a chitosan composition 101; combining the chitosan composition with water and one or more acids to form a hydrated chitosan composition 102; and removing at least a portion of the water from the hydrated chitosan composition to form a dried chitosan salt composition 103.

Figure 2:
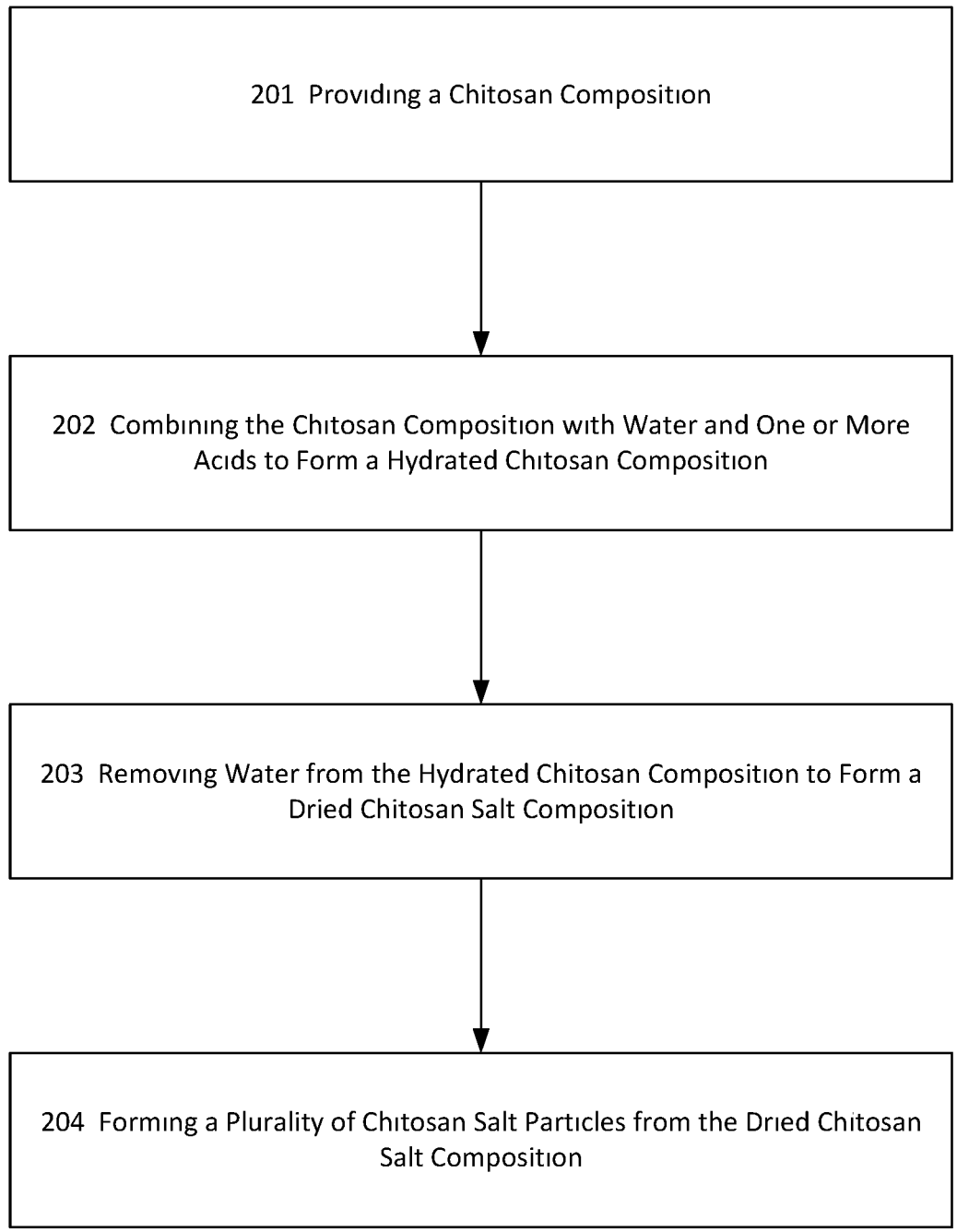
FIG. 2 shows an embodiment of the processes disclosed herein.

FIG. 2 shows a process flow 200 for certain embodiments of the methods disclosed herein. The illustrated method includes the steps of: providing a chitosan composition 201; combining the chitosan composition with water and one or more acids to form a hydrated chitosan composition 202; removing at least a portion of the water from the hydrated chitosan composition to form a dried chitosan salt composition 203; and forming a plurality of chitosan salt particles from the dried chitosan salt composition 204.

Chitosan Salt Compositions

In at least one aspect, the disclosure provides chitosan salt compositions, which are made by the processes set forth in the previous section, or any embodiments thereof. In some embodiments, the resulting chitosan salt compositions can have one or more of the following desirable properties: high fat binding, when consumed orally by a human or animal user; water solubility; and lower cost of production, due to the use of an environmentally friendly (solvent-free) process that uses a relatively small proportion of water to chitosan.

EXAMPLES

The following examples show certain illustrative embodiments of the compounds, compositions, and methods disclosed herein. These examples are not to be taken as limiting in any way. Nor should the examples be taken as expressing any preferred embodiments, or as indicating any direction for further research.

Example 1—Process for Making Chitosan Salts

Chitosan salts consist of chitosan (75 to 99%) and a selected acid (1 to 25%). The process starts with the selection of an optimal chitosan, with preferred apparent viscosity or MW, DDA and particle size. Preparation of the acidified water, heated or not, includes the selection of the acid in proportions to be obtained for the optimal chitosan salt, i.e. its desirable properties. The chitosan is placed in a stainless steel reactor. Under continuous stirring, the acidified water is added or sprayed on top of the chitosan to obtain a hydrated chitosan composition. The content of the reactor is heated up to 60° C. until the water content of the chitosan salt is 20% or less. The resulting batch is then stored in dedicated bags until milled or ground to the desired mesh size and screened. A blending step allows to achieve a homogeneous product to be later packaged into smaller bulk units.

Simple pH evaluation of the chitosan salt by dissolving 1% (w/v) into deionized water shows the lowering of the pH (<7) corresponding to the increasing acid concentration in the chitosan salt composition. The formation of chitosan salts can also be confirmed by Raman and Fourier Transform Infrared (FTIR) spectroscopic with respect to the bonding between NH2 group on chitosan and COOH group on acid detected at bands ~1,523 to 1,557 $cm^{-1}$.

This process has the advantage to favor different properties of chitosan. Water solubility of chitosan salts can be achieved with appropriate acid concentration for each respective acid. Fat-binding capacity can be tremendously increased by processing chitosan into a chitosan salt composition by the process described. Table 1 gives an example of how different succinic acid addition to two different chitosan batches can result in an increased ability to bind fat in an in vitro laboratory test mimicking stomach acid and duodenum passage compared to initial fat-binding capacity of the chitosan used to process the chitosan salt.

TABLE 1

Fat-binding capacity (g oil/g chitosan) of chitosan and derived chitosan salts as influenced by succinic acid addition. Experiment 1 uses chitosan lot S-161227-1234 and Experiment 2 uses chitosan lot S180618-1234.

| Fat-binding capacity | Addition of acid from a pre-defined amount as 1x | | | | | | |
|---|---|---|---|---|---|---|---|
| | Acid 1x | Acid 1.25x | Acid 1.5x | Acid 1.75x | Acid 2x | Acid 2.25x | Acid 3x |
| Exp. 1: 100 g oil/g chitosan S-161227-1234 | 164 | | | | 181 | | 127 |
| Increased binding (%) from initial chitosan used (Exp. 1) | 64% | | | | 81% | | 27% |
| Exp. 2: 99 g oil/g chitosan S180618-1234 | 167 | 174.4 | 172 | 188 | 176 | 168 | |
| Increased binding (%) from initial chitosan used (Exp. 2) | 79% | 89% | 89% | 110% | 99% | 93% | |

Illustrations

Illustration one is a method for making a chitosan salt, comprising: providing a chitosan composition, which comprises chitosan; combining the chitosan composition with water and one or more acids to form a hydrated chitosan composition; and removing at least a portion of the water from the hydrated chitosan composition to form a dried chitosan salt composition, which comprises chitosan salt.

Illustration two is the method of illustration one, wherein the chitosan composition comprises at least 75 weight percent, or at least 80 weight percent, or at least 85 weight percent, or at least 90 weight percent, or at least 95 weight percent, or at least 97 weight percent, or at least 99 weight percent, chitosan, based on the total weight of solids in the composition.

Illustration three is the method of illustration two, wherein the chitosan comprises at least 75 weight percent, or at least 80 weight percent, or at least 85 weight percent, or at least 90 weight percent, or at least 95 weight percent, or at least 97 weight percent, or at least 99 weight percent, alpha-chitosan, based on the total weight of chitosan in the composition.

Illustration four is the method of illustration two, wherein the chitosan comprises at least 75 weight percent, or at least 80 weight percent, or at least 85 weight percent, or at least 90 weight percent, or at least 95 weight percent, or at least 97 weight percent, or at least 99 weight percent, chitosan of crustacean origin, based on the total weight of chitosan in the composition.

Illustration five is the method of illustration two, wherein the chitosan comprises at least 75 weight percent, or at least 80 weight percent, or at least 85 weight percent, or at least 90 weight percent, or at least 95 weight percent, or at least 97 weight percent, or at least 99 weight percent, chitosan of shrimp origin, based on the total weight of chitosan in the composition.

Illustration six is the method of illustration two, wherein the chitosan has an apparent viscosity ranging from 20 cP to 200,000 cP, or from 30 cP to 10,000 cP, or from 40 cP to 2,000 cP.

Illustration seven is the method of illustration two, wherein the chitosan has weight-average molecular weight ranging from 100 kDa to 2,000 kDa, or from 100 kDa to 1,000 kDa.

Illustration eight is the method of illustration two, wherein the chitosan has a degree of deacetylation (DDA) of at least 60%, or at least 65%, or at least 70%.

Illustration nine is the method of illustration one, wherein the chitosan composition comprises chitosan in the form of a plurality of particles, wherein the plurality of particles has a particle size of no more than 18 mesh.

Illustration ten is the method of illustration nine, wherein no more than 5 weight percent, or no more than 3 weight percent, or no more than 1 weight percent of the plurality of particles have a particle size greater than 3 mm.

Illustration eleven is the method of illustration two, wherein at least 95 weight percent, or at least 97 weight percent, or at least 99 weight percent, of the plurality of particles has a particle size distribution in the range from 1 mm to 3 mm.

Illustration twelve is the method of illustration two, wherein the hydrated chitosan composition comprises from 50% to 150%, or from 50% to 120%, or from 50% to 100%, of water relative to chitosan, based on a relative weight of water to chitosan in the hydrated chitosan composition.

Illustration thirteen is the method of illustration one, wherein the hydrated chitosan composition comprises from 1% to 25%, or from 3% to 20%, or from 1% to 15%, or from 10% to 15% of the one or more acids relative to chitosan, based on a relative weight of the one or more acids to chitosan in the hydrated chitosan composition.

Illustration fourteen is the method of illustration one, wherein the one or more acids comprise an organic acid.

Illustration fifteen is the method of illustration fourteen, wherein the organic acid is an aliphatic or aromatic carboxylic acid having from 1 to 12 carbon atoms.

Illustration sixteen is the method of illustration one, wherein the one or more acids comprise acids selected from the group consisting of succinic acid, adipic acid, hydrochloric acid, glutamic acid, lactic acid, aspartic acid, acetic acid, ascorbic acid, pyruvic acid, malic acid, fumaric acid, citric acid, formic acid, glucuronic acid, sorbic acid, folic acid, maleic acid, and any combinations thereof.

Illustration seventeen is the method of illustration fourteen, wherein the one or more acids comprise acids are selected from the group consisting of succinic acid, adipic acid, glutamic acid, lactic acid, aspartic acid, acetic acid, ascorbic acid, pyruvic acid, malic acid, fumaric acid, citric acid, formic acid, glucuronic acid, sorbic acid, folic acid, maleic acid, and any combinations thereof.

Illustration eighteen is the method of illustration fourteen, wherein the hydrated chitosan composition is substantially free of organic solvents.

Illustration nineteen is the method of illustration one, wherein the combining step comprises forming the hydrated chitosan composition in a reactor, such as a stainless-steel reactor.

Illustration twenty is the method of illustration one, wherein the removing step comprises heating the hydrated chitosan composition, for example to a temperature of no more than 70° C., or no more than 65° C., or no more than 60° C.

Illustration twenty-one is the method of illustration twenty, wherein the heating comprises using steam.

Illustration twenty-two is the method of illustration one, the chitosan salt composition has a moisture content of no more than 20%, or no more than 15%, or no more than 10%, or no more than 5%, or no more than 3%, or no more than 1%, based on the weight of water in the composition relative to the weight of the composition.

Illustration twenty-three is the method of illustration one, comprising forming a plurality of chitosan salt particles from the dried chitosan salt composition.

Illustration twenty-four is the method of illustration twenty-three, wherein the forming step comprises milling the dried chitosan salt composition to form the plurality of chitosan salt particles.

Illustration twenty-five is the method of illustration twenty-three, wherein the plurality of chitosan salt particles has a particle size of no less than 20 mesh, or no less than 40 mesh, or no less than 50 mesh, or no less than 100 mesh, or no less than 200 mesh.

Illustration twenty-six is a dried chitosan salt composition, which is formed by any of the methods above.

Illustration twenty-seven is the any method above, wherein the plurality of chitosan salt particles exhibits one or more of the following properties: rapid solubilization in acid, water solubility, high fat binding when ingested by a human or animal user, and low cost, due to the use of an environmentally friendly, solvent-free process.

The invention claimed is:
1. A method for making a chitosan salt, comprising:
providing a chitosan composition, which comprises chitosan;

combining the chitosan composition, water, and one or more acids to form a paste comprising a chitosan salt hydrate; and removing at least a portion of the water from the paste to form a dried composition comprising a chitosan salt.

2. The method of claim 1, wherein the chitosan composition comprises at least 75 weight percent chitosan, based on the total weight of solids in the chitosan composition.

3. The method of claim 2, wherein the chitosan has an apparent viscosity ranging from 20 cP to 200,000 cP.

4. The method of claim 2, wherein the chitosan has weight-average molecular weight ranging from 100 kDa to 2,000 kDa.

5. The method of claim 2, wherein the chitosan has a degree of deacetylation (DDA) of at least 60%.

6. The method of claim 1, wherein the chitosan composition comprises at least 75 weight percent chitosan of crustacean origin, based on the total weight of chitosan in the chitosan composition.

7. The method of claim 1, wherein the chitosan composition comprises chitosan in the form of a plurality of particles, wherein the plurality of particles has a particle size of no more than 18 mesh.

8. The method of claim 7, wherein no more than 5 weight percent of the plurality of particles have a particle size greater than 3 mm.

9. The method of claim 7, wherein at least 95 weight percent of the plurality of particles has a particle size distribution in the range from 1 mm to 3 mm.

10. The method of claim 1, wherein the paste comprises from 50 wt % to 150 wt % of water based on the weight of the chitosan.

11. The method of claim 1, wherein the paste comprises from 1 wt % to 25 wt % of the one or more acids based on the weight of the chitosan.

12. The method of claim 1, wherein the one or more acids comprise acids selected from the group consisting of succinic acid, adipic acid, hydrochloric acid, glutamic acid, lactic acid, aspartic acid, acetic acid, ascorbic acid, pyruvic acid, malic acid, fumaric acid, citric acid, formic acid, glucuronic acid, sorbic acid, folic acid, maleic acid, and any combinations thereof.

13. The method of claim 1, wherein the paste is substantially free of organic solvents.

14. The method of claim 1, wherein the step of removing at least a portion of the water from the paste comprises heating the paste to a temperature of no more than 70° C.

15. The method of claim 14, wherein the heating comprises using steam.

16. The method of claim 1, wherein the dried composition has a moisture content of no more than 20 wt % based on the weight of the composition.

17. The method of claim 1, comprising forming a plurality of chitosan salt particles from the chitosan salt.

18. The method of claim 17, wherein the forming step comprises milling the chitosan salt to form the plurality of chitosan salt particles.

19. The method of claim 17, wherein the plurality of chitosan salt particles has a particle size of no less than 20 mesh.

20. The method of claim 17, wherein the plurality of chitosan salt particles exhibits one or more of the following properties: rapid solubilization in acid; water solubility; high fat binding when ingested by a human or animal user; and low cost, due to the use of an environmentally friendly, organic solvent-free process.

* * * * *